United States Patent
Nishiki et al.

[11] Patent Number: 5,989,782
[45] Date of Patent: Nov. 23, 1999

[54] METHOD FOR PRODUCING LIQUID CRYSTAL DISPLAY DEVICE

[75] Inventors: Hirohiko Nishiki; Yukinobu Nakata, both of Tenri; Yoshinori Shimada, Yamatokoriyama, all of Japan

[73] Assignee: Sharp Kabushiki Kaisha, Osaka, Japan

[21] Appl. No.: 08/823,726

[22] Filed: Mar. 25, 1997

[30] Foreign Application Priority Data

Mar. 26, 1996 [JP] Japan ................................. 8-070781

[51] Int. Cl.⁶ .......................................................... G02F 1/133
[52] U.S. Cl. ........................ 430/313; 430/319; 430/321; 427/378; 427/372.2; 427/126.3
[58] Field of Search .................................... 430/313, 319, 430/327, 321; 204/192.14, 192.29; 427/378, 372.2, 108, 126.3; 438/609, 30; 349/143

[56] References Cited

U.S. PATENT DOCUMENTS

| | | | |
|---|---|---|---|
| 5,166,085 | 11/1992 | Wakai et al. | 437/40 |
| 5,185,059 | 2/1993 | Nishida et al. | 216/23 |
| 5,585,951 | 12/1996 | Noda et al. | 349/122 |
| 5,641,974 | 6/1997 | den Boer et al. | 257/59 |

FOREIGN PATENT DOCUMENTS

| | | |
|---|---|---|
| 58-172685 | 10/1983 | Japan . |
| 5-346575 | 12/1993 | Japan . |
| 6-88973 | 3/1994 | Japan . |

*Primary Examiner*—John A. McPherson
*Attorney, Agent, or Firm*—David G. Conlin; George W. Neuner

[57] ABSTRACT

A method for producing a liquid crystal display device includes: a pair of insulating substrates; a liquid crystal layer interposed between the pair of insulating substrates; switching elements arranged in a matrix on one of the pair of the insulating substrates; gate lines and data lines, arranged to intersect each other, for controlling the switching elements; and pixel electrodes provided above the gate lines and the data lines with an organic insulating film therebetween. The method includes the steps of forming a transparent conductive film on the organic insulating film at a first temperature; annealing the transparent conductive film at a second temperature equal to or lower than the first temperature; and patterning the transparent conductive film to form the pixel electrodes after the step of annealing.

4 Claims, 6 Drawing Sheets

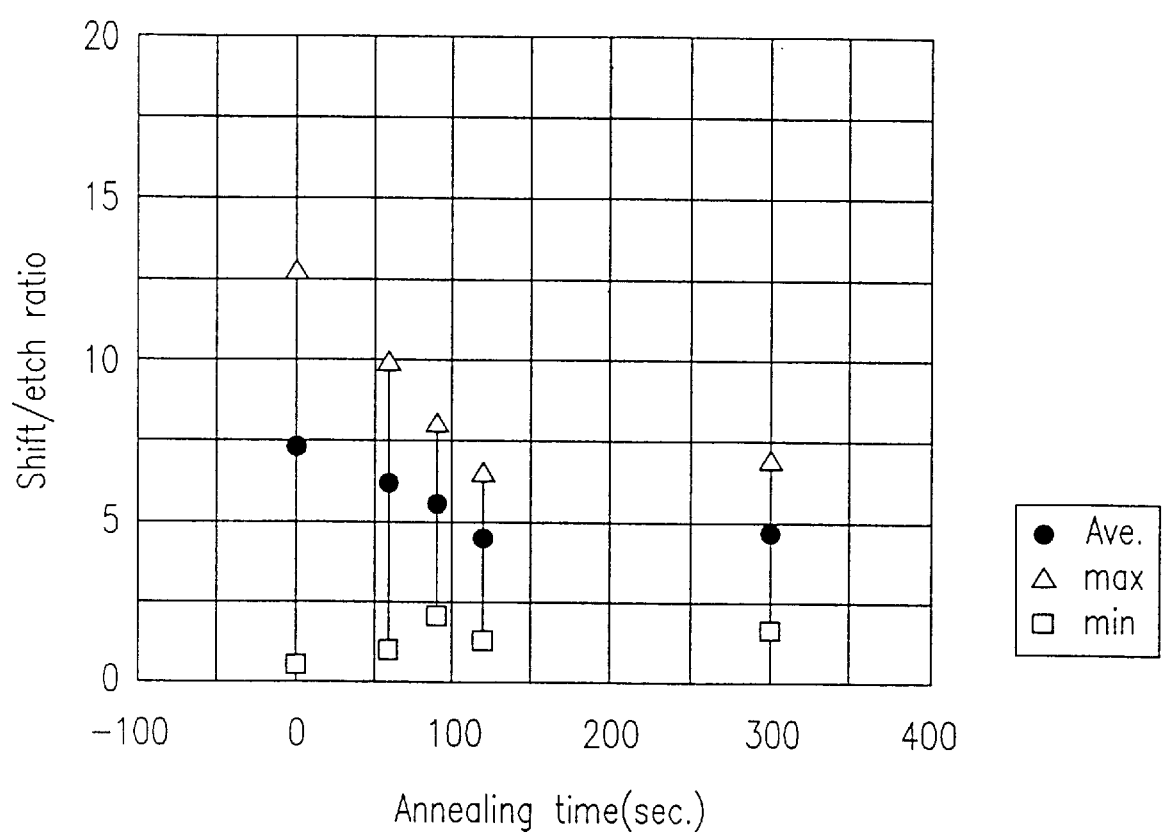

METHOD FOR PRODUCING LIQUID CRYSTAL DISPLAY DEVICE

BACKGROUND OF THE INVENTION

1. Field of the Invention

The present invention relates to an active matrix substrate incorporated, for example, in a liquid crystal display device.

2. Description of the Related Art

An active matrix type liquid crystal display device is known which is provided with a so-called active matrix substrate. Such an active matrix substrate includes thin film transistors (hereinafter, simply referred to as "TFTs") having channel regions made of, for example, amorphous Si, or metal insulator metal elements (i.e., MIM elements) on a substrate along with a plurality of gate lines and data lines, the gate lines and the data lines intersecting each other.

Conventionally, an inorganic material such as silicon nitride (SiN) is used as an insulating film for the active matrix substrate. Recently, an organic material such as a photosensitive transparent acrylic resin is also used as the insulating film.

As described, for example, in Japanese Laid-Open Patent Publication No. 58-172685, the insulating film made of the organic material, i.e., an organic insulating film is expected to be widely used as an interlayer insulating film utilized in a high aperture ratio structure of a liquid crystal display device.

FIG. 2A is a plan view showing a one-pixel portion of an active matrix substrate in a liquid crystal display device having a high aperture ratio structure by using an organic insulating film. FIG. 2B is a cross-sectional view showing the same active matrix substrate taken along line II—II of FIG. 2A. Referring to FIGS. 2A and 2B, gate lines 1 having protruding portions and common lines 3 are provided on an insulating substrate 9. The common lines 3 extend in parallel with the gate lines 1. A gate insulating film 8 is provided on the gate lines 1 and the common lines 3 so as to cover the insulating substrate 9, on which data lines 2 having protruding portions and drain electrodes 4 are provided. Each of the protruding portions of the gate lines 1 acts as a gate electrode and each of the protruding portions of the data lines 2 acts as a source electrode. The gate electrode, the source electrode and the drain electrode 4 form each of TFTs 7, i.e., switching elements. An organic insulating film 10 is provided on such a structure so as to cover the entire surface of the substrate 9. Pixel electrodes 6 are provided on the organic insulating film 10 so as to make contact with the respective drain electrodes 4 via respective contact holes 5 formed through the organic insulating film 10. By laying the pixel electrodes 6 over the gate lines 1 and the data lines 2 in the above-described manner, an active matrix substrate with an increased aperture ratio can be obtained.

As can be appreciated from the above, in order to form the active matrix substrate having the increased aperture ratio structure shown in FIGS. 2A and 2B, a step of forming a transparent conductive film (i.e., the pixel electrode 6) on the organic insulating film 10 is essential. However, heat resistance of the organic insulating film is inferior compared to that of an inorganic insulating film. Therefore, methods disclosed in Japanese Laid-Open Patent Publication No. 5-346575 and Japanese Laid-Open Patent Publication No. 6-88973 may be used for forming a transparent conductive film which has equivalent characteristics (e.g., in terms of accurate patterning upon etching, low electric resistance and uniformity) as those of a transparent conductive film formed on an inorganic insulating film.

In the methods disclosed in Japanese Laid-Open Patent Publication No. 5-346575 and Japanese Laid-Open Patent Publication No. 6-88973, the transparent conductive film is formed on the organic insulating film as follows. A transparent conductive film is deposited on an organic insulating film at a sufficiently low temperature, i.e., approximately room temperature. Then, the obtained film is annealed in an atmosphere such as air or hydrogen which is different from the atmosphere used to form the transparent conductive film and at a temperature higher than the temperature employed to deposit the film but equal to or lower than a temperature at which the organic insulating film can withstand the heat.

However, in the case where the annealing is conducted in a film formation apparatus by the above-described method, time for heating and cooling the insulating substrate, and time for exchanging gas is required. Thus, the processing performance of the film formation apparatus is significantly deteriorated. As a result, an annealing apparatus needs to be provided separately from the film formation apparatus, in which case the number of the production steps are increased.

SUMMARY OF THE INVENTION

A method for producing a liquid crystal display device includes: a pair of insulating substrates; a liquid crystal layer interposed between the pair of insulating substrates; switching elements arranged in a matrix on one of the pair of the insulating substrates; gate lines and data lines, arranged to intersect each other, for controlling the switching elements; and pixel electrodes provided above the gate lines and the data lines with an organic insulating film therebetween. The method includes the steps of: forming a transparent conductive film on the organic insulating film at a first temperature; annealing the transparent conductive film at a second temperature equal to or lower than the first temperature; and patterning the transparent conductive film to form the pixel electrodes after the step of annealing.

In one embodiment of the present invention, the step of annealing is performed by keeping the transparent conductive film at the second temperature for a predetermined time.

In another embodiment of the present invention, the predetermined time is at least 1 minute.

According to still another embodiment of the present invention, the step of annealing is performed in a film formation apparatus for forming the transparent conductive film.

In yet another embodiment of the present invention, the step of forming the transparent conductive film is conducted by sputtering and the step of annealing is conducted while maintaining the first temperature and a flow rate of gas for forming the transparent conductive film by sputtering.

According to another aspect of the present invention, a film formation apparatus includes a film deposition chamber in which a transparent conducive film is formed on a substrate at a first temperature; and an annealing chamber in which the transparent conductive film is formed at a second temperature equal to or lower than the first temperature.

In one embodiment of the present invention, the substrate is heated in the annealing chamber prior to a formation of the transparent conductive film.

In another embodiment of the present invention, the second temperature and the first temperature are substantially equal to each other and a flow rate of gas in the annealing chamber and a flow rate of gas in the film deposition chamber are substantially equal to each other.

According to the present invention, annealing can be performed in a film formation apparatus within a time that gives no adverse effect to the production performance. Therefore, there is no need for providing the annealing apparatus separately from the film formation apparatus. As a result, time and the number of facilities required for the production can be reduced. As a result, production cost can be reduced.

Thus, the invention described herein makes possible the advantages of (1) providing a method for producing a liquid crystal display device by which a uniform transparent conductive film with low electric resistance and a satisfactory patterning accuracy upon etching can be achieved without increasing the number of production steps; and (2) providing a film formation apparatus for forming such a transparent conductive film.

These and other advantages of the present invention will become apparent to those skilled in the art upon reading and understanding the following detailed description with reference to the accompanying figures.

BRIEF DESCRIPTION OF THE DRAWINGS

FIG. 4 is a graph showing a relationship between an annealing time of an ITO film formed on an organic insulating film, and a shift/etch ratio of the ITO film upon etching and a uniformity thereof in the plane of the ITO film;

DESCRIPTION OF THE PREFERRED EMBODIMENTS

Hereinafter, a method for producing a liquid crystal display device according to the present invention will be described by way of illustrative examples with reference to the accompanying drawings.

Figure 1A:
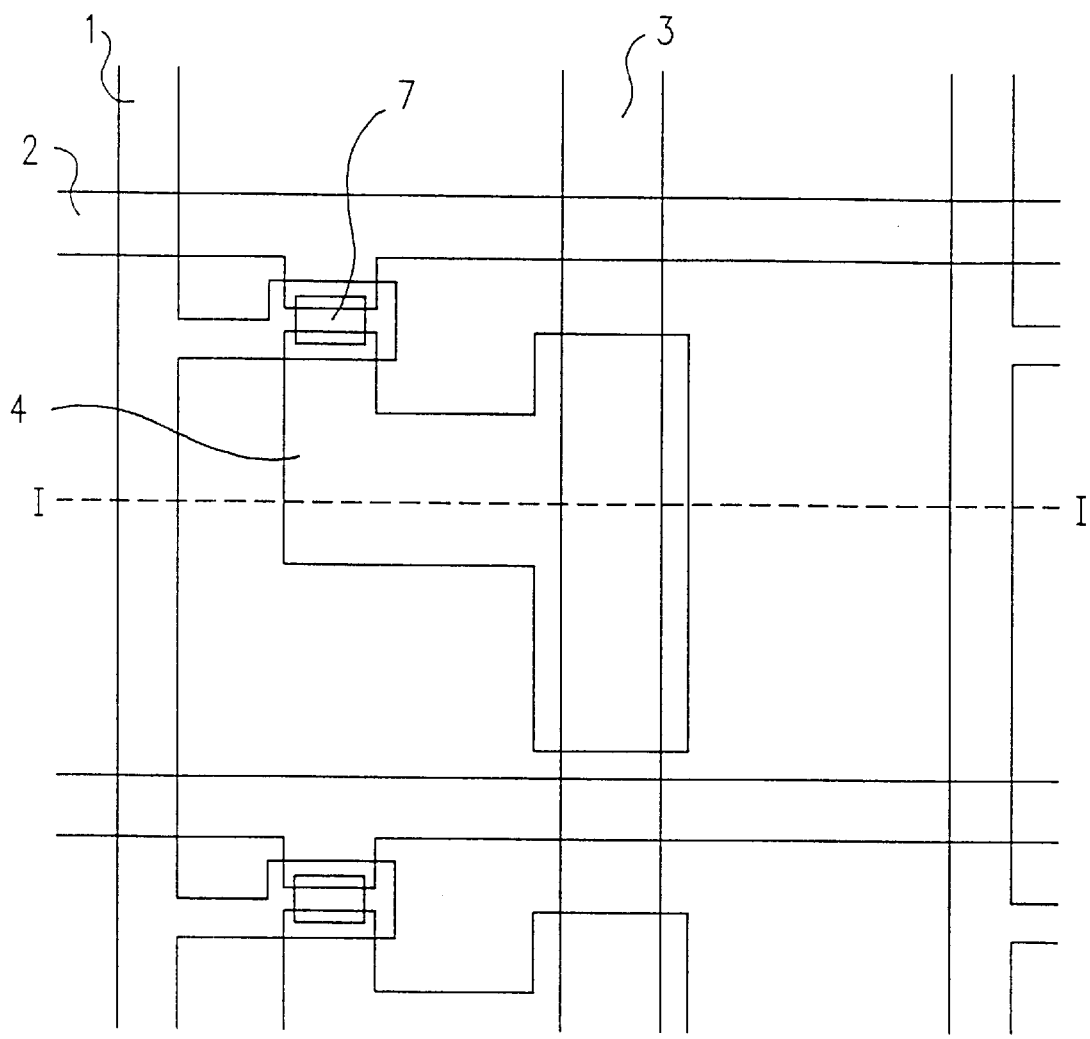
FIG. 1A is a plan view showing a one-pixel portion of an active matrix substrate having a high aperture ratio structure of a liquid crystal display device which is in the middle of a production process according to the present invention.
Figure 1B:
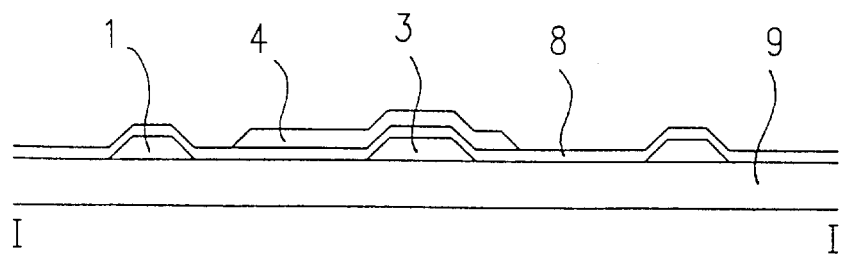
FIG. 1B is a cross-sectional view showing the one-pixel portion of the active matrix substrate of the liquid crystal display device according to the present invention taken along line I—I of FIG. 1A.
Figure 2A:
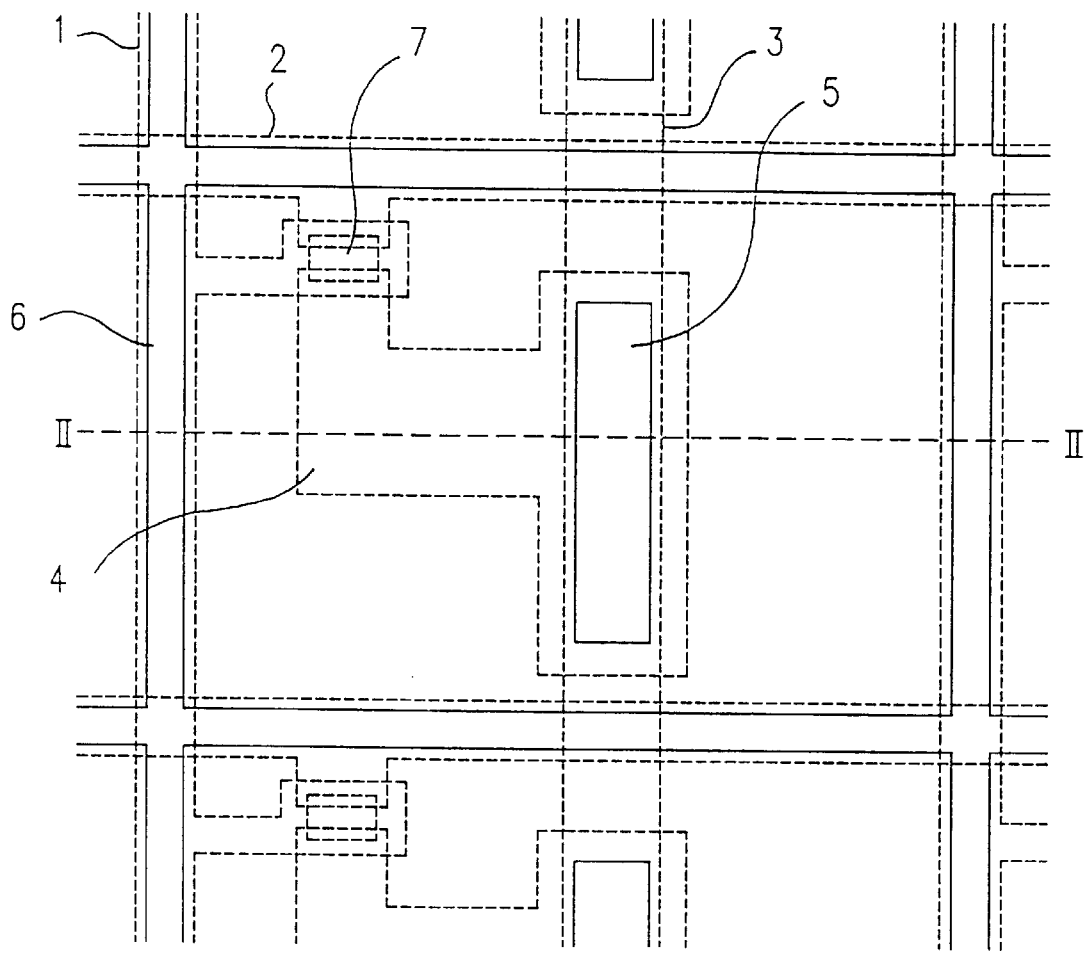
FIG. 2A is a plan view showing a one-pixel portion of an active matrix substrate having a high aperture ratio structure using an organic insulating film.
Figure 2B:
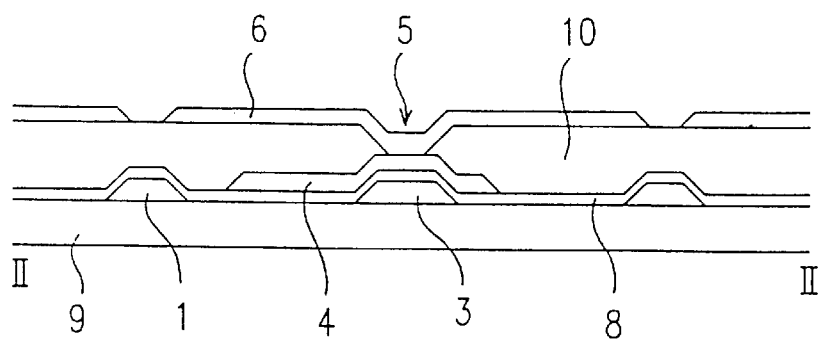
FIG. 2B is a cross-sectional view showing the one-pixel portion of the active matrix substrate taken along line II—II of FIG. 2A.

FIG. 1A is a plan view showing a one-pixel portion of an active matrix substrate having a high aperture ratio structure which is in the middle of the production process according to the present invention. FIG. 1B is a cross-sectional view showing the one-pixel portion of the same active matrix substrate taken along line I—I of FIG. 1A. In both FIGS. 1A and 1B, the active matrix substrate has just been provided with drain electrodes 4. An active matrix substrate shown in FIGS. 2A and 2B is obtained by forming an organic insulating film 10 and pixel electrodes 6 on the active matrix substrate shown in FIGS. 1A and 1B. FIGS. 3A through 3F are cross-sectional views showing the steps for producing the active matrix substrate of a liquid crystal display device according to the present invention. In the figures, like components are denoted by the same reference numerals, and the description thereof is omitted.

According to a conventional method disclosed, for example, in Japanese Laid-Open Patent Publication No. 5-346575 and Japanese Laid-Open Patent Publication No. 6-88973, after an ITO (indium tin oxide) film is formed as a transparent conductive film on an organic insulating film at a low temperature, the ITO film is annealed at a temperature higher than the temperature for forming the ITO film for approximately 1 to 2 hours. According to the present invention, after an ITO film is formed on an organic insulating film, the ITO film is annealed while maintaining the temperature equal to or lower than the temperature for forming the ITO film for a predetermined time. Therefore, according to the conventional method, annealing is conducted in an apparatus other than the film formation apparatus, for example, in an oven, whereas according to the present invention, formation and annealing of the ITO film can be succeedingly conducted in the film formation apparatus.

Hereinafter, a method for producing an active matrix substrate of a liquid crystal display device according to the present invention will be described with reference to FIGS. 3A through 3F.

Figure 3A:
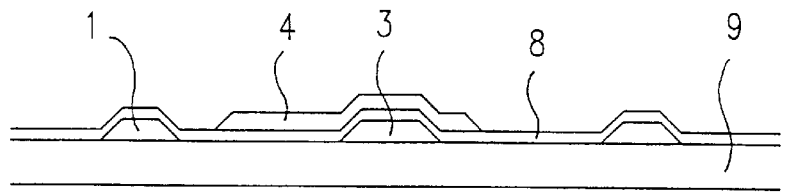
FIGS. 3A through 3F are cross-sectional views showing the main steps of producing an active matrix substrate of a liquid crystal display device according to the present invention.

As shown in FIG. 3A, a metal film is formed on an insulating substrate 9 and patterned so as to form gate lines 1 and common lines 3, the gate lines 1 and the common lines 3 being parallel to each other. Each of the gate lines 1 has a plurality of protruding portions which act as gate electrodes of the TFTs 7 (i.e., switching elements). A glass substrate can be used as the insulating substrate 9. The gate lines 1 and the common lines 3 can be made of Ta or Al. In the present example, the gate lines 1 and the common lines 3 are made of Ta. Subsequently, a gate insulating film 8 made of, for example, SiNx is formed on the obtained structure so as to cover the entire surface of the substrate 9. Then, a metal film is formed and patterned to obtain the data lines 2 (FIG. 3A) and the drain electrodes 4 on the gate insulating film 8. Each of the data lines 2 has a plurality of protruding portions which act as source electrodes of TFTs 7. The data lines 2 and the drain electrodes 4 can be made of Ta or Al. In the present example, the data lines 2 are made of Ta/ITO and the drain electrodes 4 are made of ITO.

Figure 3B:
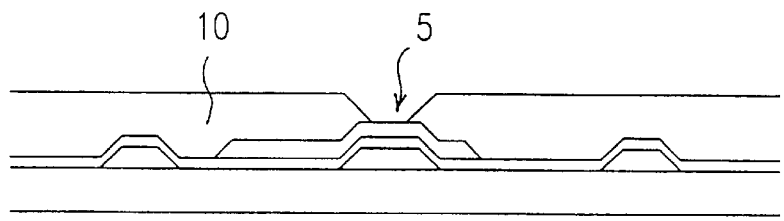
Figure 3C:
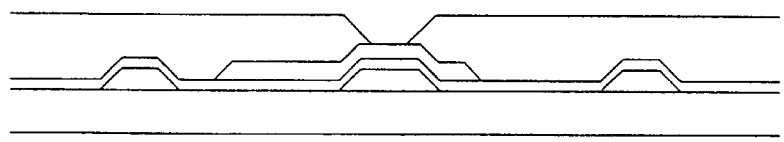

Subsequently, as shown in FIG. 3B, an organic insulating film 10 having contact holes 5 therethrough is formed on the substrate 9. According to the present example, the organic insulating film 10 is made of a photosensitive transparent acrylic resin. Specifically, the photosensitive transparent acrylic resin is applied on the substrate 9 by spin coating, exposed to light by photolithography and then developed with an alkaline solution, thereby obtaining the organic insulating film 10 with the contact holes 5 reaching the respective drain electrodes 4. Succeedingly, as shown in FIG. 3C, the organic insulating film 10 is heated to be cured at a temperature of 200° C.

Figure 3D:
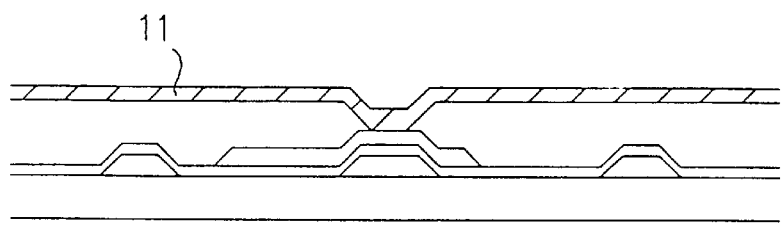
Figure 3E:
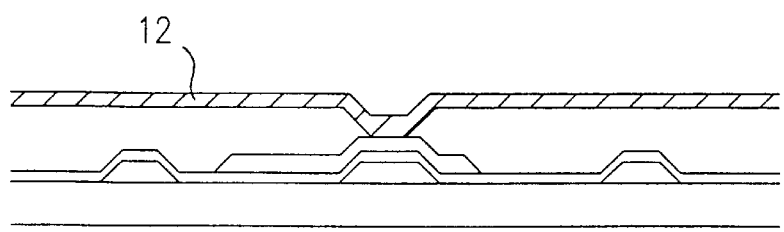
Figure 3F:
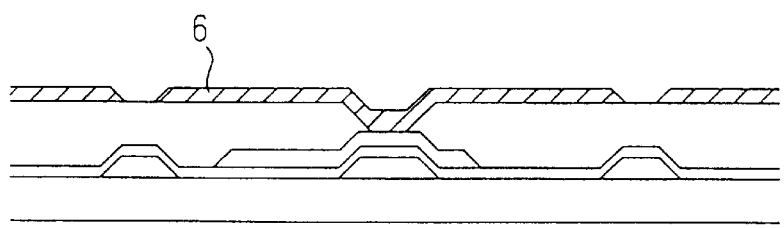

Then, a transparent conductive film 11 for a pixel electrode is formed. In the present example, as shown in FIG. 3D, an ITO film is deposited on the organic insulating film 10 to a thickness of 800 to 1200 Å in a film deposition chamber in a multi-chamber type sputtering apparatus at a temperature of 230° C. The ITO film is deposited using mixed gas of $O_2$ and Ar as sputtering gas and an $In_2O_3$ (containing 5% of $SnO_2$) target. The sputtering is performed under the following conditions: a flow rate of gas of 100 sccm, gas pressure of 0.7 Pa, electric power of 2.3 kW and a substrate temperature of 230° C. Then, the transparent conductive film 11 (i.e., the ITO film) is annealed by keeping the film 11 in the film deposition chamber in the sputtering apparatus in such a manner that the temperature and the flow rate of gas therein are maintained equal to those employed for film deposition. Thus, as shown in FIG. 3E, a transparent conductive film 12 is obtained. In the present example, the transparent conductive film 11 is maintained in the film deposition chamber for 2 minutes. Thereafter, as shown in FIG. 3F, the annealed transparent conductive film 12 is etched so as to form the pixel electrodes 6 disposed in a matrix as shown in FIG. 2A. In the present example, the annealed transparent conductive film (i.e., the annealed ITO film) 12 is etched by using HCl.

Hereinafter, a relationship between a ratio of a line width shift upon etching to an etching rate of the ITO film (hereinafter, simply referred to as a "shift/etch ratio") and an annealing time of the ITO film will be described. FIG. 4 is a graph showing the shift/etch ratio and a uniformity thereof in the plane of the ITO film 12, depending on the annealing time of the ITO film 11 in the case where the annealed ITO film 12 formed on the organic insulating film 10 is etched with HCl using a method according to the present invention. In the graph, ● represents an average value of the shift/etch ratio in the plane of the ITO film 12; Δ and □ represent a maximum value and a minimum value of the shift/etch ratio in the plane of the ITO film 12, respectively.

A patterning accuracy of etching is defined by the shift/etch ratio. The smaller and the more uniform the ratio in the plane of the ITO film 12 is, the better the patterning accuracy is and thus the more stable the process is. Although the preferable shift/etch ratio depends on the process and the design standard of production, in the case of the active matrix substrate having a high aperture ratio structure shown in FIGS. 2A and 2B, the ratio is 10 or lower, preferably 7 or lower.

As can be appreciated from the graph, according to the method of the present invention, the maximum value of the shift/etch ratio can be made 10 or less by setting the annealing time to 1 minute or longer. Furthermore, the maximum value of the shift/etch ratio can be 7 or less by setting the annealing time to 2 minutes or longer. Moreover, it can be also appreciated that when the annealing time exceeds 1 minute, not only an amount of the line width shift is reduced but also uniformity in the plane of the ITO film is enhanced. Therefore, the annealing of the ITO film 11 shown in FIG. 3E is performed for 1 minute or longer, preferably 2 minutes or longer. Thus, a process is established which is capable of producing an active matrix substrate of a high aperture ratio structure such as that shown in FIGS. 2A and 2B in a sufficiently stable manner.

The application of the above-described deposition and annealing steps of the transparent conductive film (i.e., the ITO film) is not limited to a production of an active matrix substrate employing an organic insulating film as an interlayer insulating film. The steps are also applicable for forming an ITO film on an active matrix substrate using low temperature polysilicon.

Furthermore, in the present example, the formed transparent conductive film is annealed in a film deposition chamber in a film formation apparatus (a sputtering apparatus in this example) by maintaining the film for a predetermined period of time. However, a deterioration in the processing performance of the film formation apparatus can be avoided if the annealing is conducted in a chamber other than the film deposition chamber in the film formation apparatus.

For example, 2 minutes for pre-heating the substrate, 2 minutes for forming the film and 2 minutes for annealing the film is required. In a conventional multi-chamber type film formation apparatus, a substrate introduced from a substrate introducing chamber is heated in a heating chamber for 2 minutes, provided with a film in the film deposition chamber for 2 minutes and thereafter annealed for 2 minutes. Consequently, the processing performance of the conventional film formation apparatus is 4 minutes at the fastest.

Such a limit in the processing performance of the film formation apparatus can be avoided by providing an annealing chamber which can simultaneously anneal a plurality of films on the substrates in addition to the film deposition chamber.

Figure 5A:
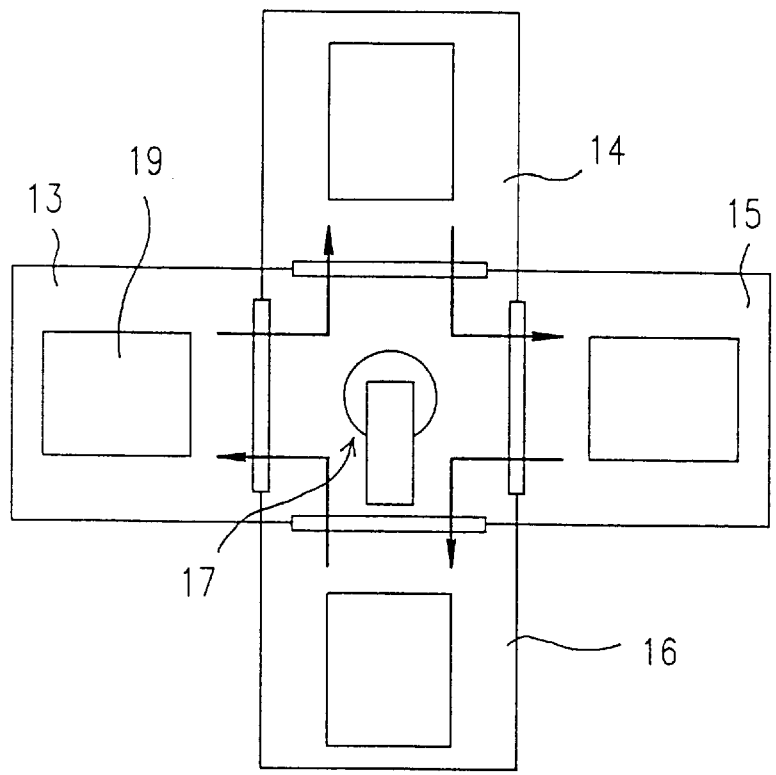
FIG. 5A is a schematic view showing an exemplary multi-chamber type film formation apparatus according to the present invention.

FIG. 5A is a schematic view showing an exemplary multi-chamber type film formation apparatus provided with the above-described annealing chamber. A substrate 19 is carried into a heating chamber 14 from a substrate introducing chamber 13 by a substrate carrier 17, thereby being pre-heated. Then, the substrate 19 is carried into a film deposition chamber 15 to be provided with a transparent conductive film by sputtering. Thereafter, the substrate 19 is carried into an annealing chamber 16 in which a temperature and a flow rate of gas are maintained equal to those in the film deposition chamber 15. After keeping the substrate 19 in the annealing chamber 16 for a predetermined time, the substrate 19 is taken out from the substrate introducing chamber 13. In the case of such a multi-chamber type film formation apparatus shown in FIG. 5A, the processing performance of the apparatus is not deteriorated by the annealing process. This is because the film deposition chamber and the annealing chamber are separately provided so that both film formation and annealing can be simultaneously conducted for 2 minutes, respectively.

Figure 5B:
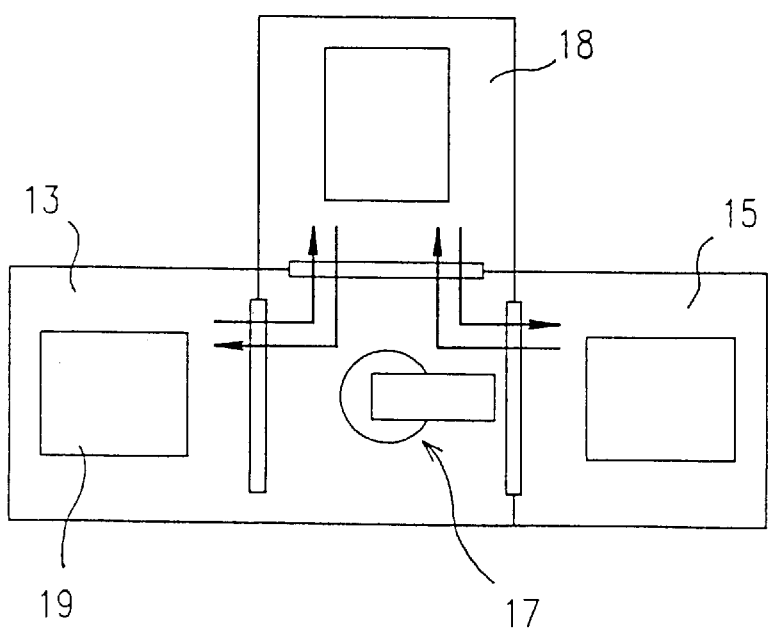
FIG. 5B is a schematic view showing another exemplary multi-chamber type film formation apparatus according to the present invention.

Furthermore, FIG. 5B is a schematic view showing another exemplary multi-chamber type film formation apparatus. As shown in FIG. 5B, the film formation apparatus includes an annealing chamber 18 which also serves as a heating chamber for pre-heating a substrate 19 prior to a film deposition process. By such an arrangement, enlargement of the film formation apparatus caused by the additional annealing chamber can be avoided. The pre-heating and the annealing can be simultaneously performed on a plurality of substrates 19 in the heating/annealing chamber 18 because both processes are substantially the same. Specifically, the substrate 19 placed in the substrate introducing chamber 13 is preheated in the heating/annealing chamber 18 for 2 minutes, provided with film in the film deposition chamber 15 for 2 minutes and annealed again in the heating/annealing chamber 18 for 2 minutes. The temperature and the flow rate of gas in the heating/annealing chamber 18 are set equal to those in the film deposition chamber 15. The processing performance of the film formation apparatus shown in FIG. 5B is not deteriorated since the preheating and the annealing are simultaneously conducted.

Since the pre-heating of the substrate 19 is performed under a low pressure, the annealing after the film deposition is also performed under a low pressure. According to an experiment conducted by the present inventors, pressure during the annealing is found not to cause any substantial effect, for example, in terms of patterning accuracy of the ITO film upon etching.

Figure 6:
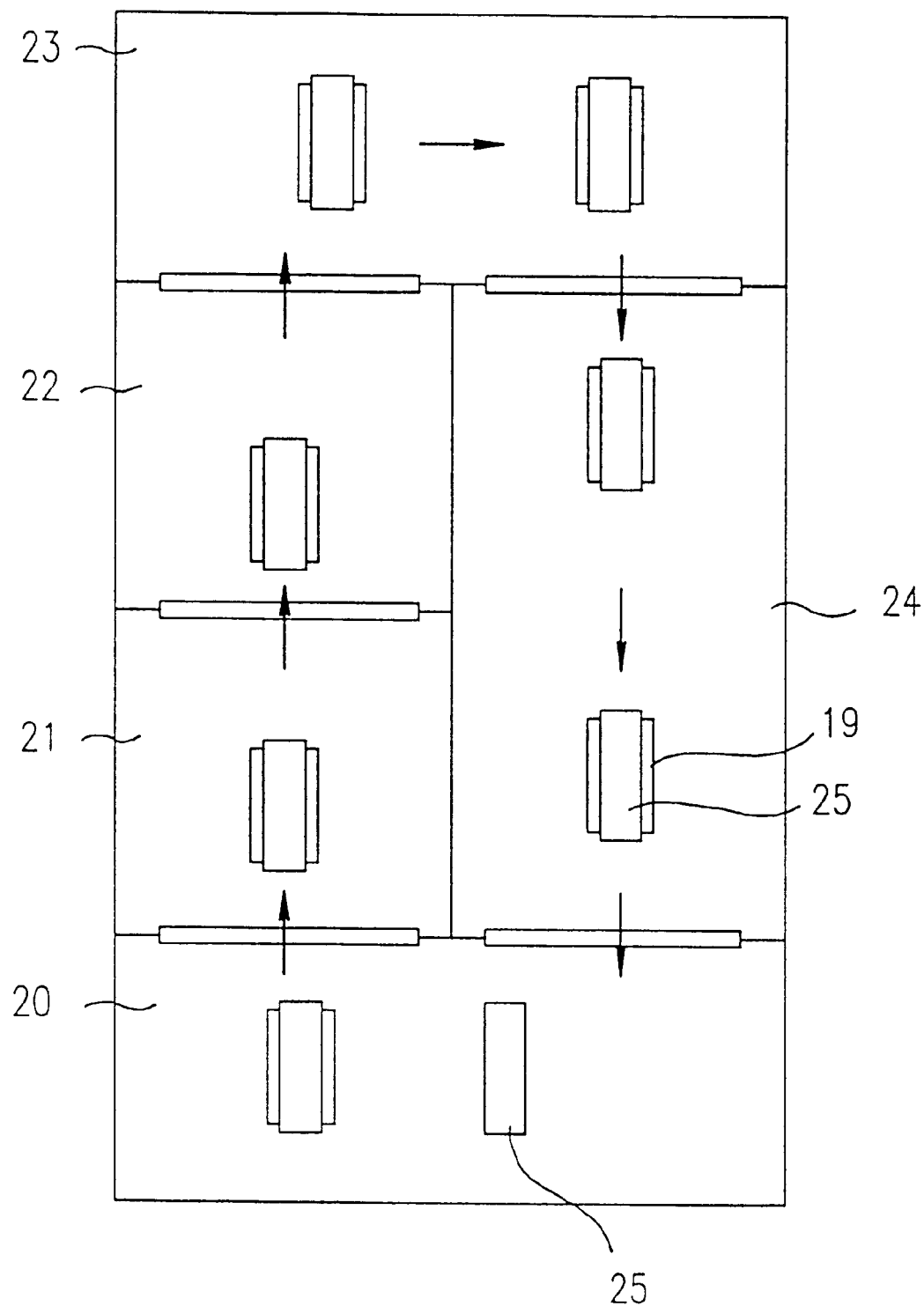
FIG. 6 is a schematic view showing an exemplary in-line type film formation apparatus according to the present invention.

Moreover, the film formation apparatus is not limited to a multi-chamber type shown in FIGS. 5A and 5B. An in-line type film formation apparatus shown in FIG. 6 is also available. In the in-line type film formation apparatus, the formation and the annealing of the transparent conductive film are conducted in a manner similar to that in the multi-chamber type film formation apparatus. Specifically, a substrate 19 introduced from the substrate introducing chamber 20 is placed into a heating chamber 21 by a substrate carrying tray 25. The substrate 19 is pre-heated in the heating chamber 21, for example, for 2 minutes and carried into a film deposition chamber 22 with the substrate carrying tray 25. A transparent conductive film is deposited on the substrate 19 by sputtering in the film deposition chamber 22. Subsequently, the substrate 19 is carried into an annealing chamber 23 and maintained therein, for example, for 2 minutes. The temperature and the flow rate of gas in the annealing chamber 23 are set equal to those in the film deposition chamber 22. After the annealing, the substrate 19 is carried into the substrate introducing chamber 20 through a cooling chamber 24, thereby taken out from the film formation apparatus. In the case of such an in-line type film formation apparatus, the annealing can be conducted without deteriorating the processing performance of the apparatus by providing the annealing chamber 23 after the film deposition chamber 22, as shown in FIG. 6.

Conventionally, in the case where an ITO film is formed on an organic insulating film, a substrate needs to be annealed in an oven for 1 to 2 hours after forming the ITO film for obtaining an ITO film having an excellent patterning accuracy upon etching.

On the other hand, according to the method of the present invention, sufficient effect can be obtained by annealing in a film formation apparatus for about 1 to 2 minutes at a temperature equal to or lower than the temperature of the film formation. Thus, an ITO film with excellent patterning accuracy can be formed on an organic insulating film with less processing time as compared to the conventional method. As a result, the production cost of a liquid crystal display device can be reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a liquid crystal display device including: a pair of insulating substrates including an active matrix substrate; a liquid crystal layer interposed between the pair of insulating substrates; the active matrix substrate including: switching elements arranged in a matrix; gate lines and data lines, arranged to intersect each other, for controlling the switching elements, the active matrix substrate not including a color filter layer for conducting a color display; and pixel electrodes provided above the gate lines and the data lines with an organic insulating film therebetween, the method comprising the steps of:

forming a transparent conductive film at a first temperature on the organic insulating film on the active matrix substrate;

annealing the transparent conductive film at a second temperature equal to or lower than the first temperature; and patterning the transparent conductive film to form the pixel electrodes after the step of annealing.

2. A method for producing a liquid crystal display device according to claim 1, wherein the step of annealing is performed by keeping the transparent conductive film at the second temperature for at least 1 minute.

3. A method for producing a liquid crystal display device according to claim 1, wherein the step of annealing is performed in a film formation apparatus for forming the transparent conductive film.

4. A method for producing a liquid crystal display device according to claim 1, wherein the step of forming the transparent conductive film is conducted by sputtering and the step of annealing is conducted while maintaining the first temperature and a flow rate of gas for forming the transparent conductive film by sputtering.

* * * * *